(12) United States Patent
Patterson

(10) Patent No.: US 9,772,665 B2
(45) Date of Patent: Sep. 26, 2017

(54) POWER SWITCHING IN A TWO-WIRE CONDUCTOR SYSTEM

(71) Applicant: ANALOG DEVICES, INC., Norwood, MA (US)

(72) Inventor: Stuart Patterson, East Walpole, MA (US)

(73) Assignee: ANALOG DEVICES, INC., Norwood, MA (US)

( * ) Notice: Subject to any disclaimer, the term of this patent is extended or adjusted under 35 U.S.C. 154(b) by 734 days.

(21) Appl. No.: 14/102,603

(22) Filed: Dec. 11, 2013

(65) Prior Publication Data

US 2014/0101477 A1    Apr. 10, 2014

Related U.S. Application Data

(63) Continuation-in-part of application No. 13/646,397, filed on Oct. 5, 2012, and a continuation-in-part of
(Continued)

(51) Int. Cl.
*H02M 3/07* (2006.01)
*G06F 1/26* (2006.01)
(Continued)

(52) U.S. Cl.
CPC .............. *G06F 1/263* (2013.01); *G06F 1/266* (2013.01); *G06F 1/28* (2013.01); *G06F 13/4256* (2013.01)

(58) Field of Classification Search
None
See application file for complete search history.

(56) References Cited

U.S. PATENT DOCUMENTS

| 4,317,211 A | 2/1982 | Quesnell, Jr. |
| 4,542,420 A | 9/1985 | Kozlik et al. |

(Continued)

FOREIGN PATENT DOCUMENTS

| CN | 200944109 Y | 9/2007 |
| CN | 201196834 Y | 2/2009 |

(Continued)

OTHER PUBLICATIONS

Extended Search Report for European Patent Application Serial No. 14173943.3 mailed Nov. 5, 2014.
(Continued)

*Primary Examiner* — Jared Fureman
*Assistant Examiner* — Aqeel Bukhari
(74) *Attorney, Agent, or Firm* — Patent Capital Group

(57) ABSTRACT

In an example embodiment, a power switching circuit of an automobile audio bus ($A^2B$) chip is provided in a bi-directional, multi-node two-wire conductor system that includes a plurality of $A^2B$ chips interconnected on a twisted wire pair bus ($A^2B$ bus), with at least one $A^2B$ chip functioning as a master and the remaining $A^2B$ chips functioning as slaves. The power switching circuit of the $A^2B$ chip powers up a next downstream $A^2B$ chip in the $A^2B$ bus sequentially according to a power switching procedure, and the power switching circuit is configured to detect faults in the $A^2B$ bus before, during, and after the power switching procedure. Each $A^2B$ chip enables power to the next downstream $A^2B$ chip without risk of damage to any components in the system due to line faults on the downstream $A^2B$ bus, or collapse of the power supply at the local $A^2B$ chip.

19 Claims, 7 Drawing Sheets

Related U.S. Application Data application No. 13/646,382, filed on Oct. 5, 2012, now Pat. No. 8,990,464.

(60) Provisional application No. 61/843,891, filed on Jul. 8, 2013, provisional application No. 61/843,896, filed on Jul. 8, 2013, provisional application No. 61/843,902, filed on Jul. 8, 2013, provisional application No. 61/845,542, filed on Jul. 12, 2013.

(51) Int. Cl.
  *G06F 1/28* (2006.01)
  *G06F 13/42* (2006.01)

(56) References Cited

U.S. PATENT DOCUMENTS

| | | | |
|---|---|---|---|
| 4,675,884 A | 6/1987 | Nakamura et al. |
| 4,840,448 A | 6/1989 | Thiennot |
| 4,860,309 A | 8/1989 | Costello |
| 4,965,881 A | 10/1990 | Dilley |
| 5,056,114 A | 10/1991 | Wight |
| 5,168,511 A | 12/1992 | Boles |
| 5,412,652 A | 5/1995 | Lu |
| 5,446,765 A | 8/1995 | Leger |
| 5,696,800 A | 12/1997 | Berger |
| 5,793,993 A | 8/1998 | Broedner |
| 5,805,632 A | 9/1998 | Leger |
| 5,819,051 A | 10/1998 | Murray |
| 5,974,475 A | 10/1999 | Day |
| 6,008,746 A | 12/1999 | White |
| 6,085,258 A | 7/2000 | Dreyer |
| 6,115,831 A | 9/2000 | Hanf et al. |
| 6,240,478 B1 | 5/2001 | Brickell |
| 6,285,722 B1 | 9/2001 | Banwell et al. |
| 6,298,104 B1 | 10/2001 | Saeki |
| 6,326,851 B1 | 12/2001 | Staszewski et al. |
| 6,363,437 B1 | 3/2002 | Ptasinski |
| 6,370,212 B1 | 4/2002 | Nakai |
| 6,611,537 B1 | 8/2003 | Edens et al. |
| 6,628,212 B1 | 9/2003 | Toutant |
| 6,629,172 B1 | 9/2003 | Andersson et al. |
| 6,745,270 B1 | 6/2004 | Barenys et al. |
| 6,892,147 B2 * | 5/2005 | Bui .................. G06F 1/263 320/107 |
| 6,928,501 B2 | 8/2005 | Andreas et al. |
| 6,937,957 B2 | 8/2005 | Viard |
| 6,947,335 B2 | 9/2005 | Nakamura et al. |
| 6,987,824 B1 | 1/2006 | Boerstler |
| 7,061,926 B2 | 6/2006 | Breinlinger |
| 7,073,458 B2 | 7/2006 | Sjölund et al. |
| 7,177,661 B2 | 2/2007 | Shpak |
| 7,249,209 B2 | 7/2007 | Yang |
| 7,315,551 B2 | 1/2008 | Olson |
| 7,348,803 B2 | 3/2008 | Bui |
| 7,395,962 B2 | 7/2008 | Barta |
| 7,487,331 B2 | 2/2009 | Thomsen |
| 7,514,962 B2 | 4/2009 | Kumar |
| 7,539,804 B2 | 5/2009 | Miura |
| 7,555,016 B2 | 6/2009 | Page |
| 7,567,642 B2 | 7/2009 | White |
| 7,574,234 B2 | 8/2009 | Conyers |
| 7,587,539 B2 | 9/2009 | Picard |
| 7,631,110 B2 | 12/2009 | Berenbaum |
| 7,656,956 B2 | 2/2010 | King |
| 7,664,015 B2 | 2/2010 | Price et al. |
| 7,673,084 B2 | 3/2010 | Krampl et al. |
| 7,685,449 B2 | 3/2010 | Terasawa |
| 7,702,832 B2 | 4/2010 | Bohm |
| 7,707,339 B2 | 4/2010 | Pigott |
| 7,715,450 B2 | 5/2010 | Ohara |
| 7,802,036 B2 | 9/2010 | Takeuchi |
| 7,827,335 B2 | 11/2010 | Liao |
| 7,835,462 B2 | 11/2010 | Oishi |
| 7,890,684 B2 | 2/2011 | Berenbaum |
| 7,931,198 B2 | 4/2011 | Hall |
| 8,055,825 B2 | 11/2011 | Bohm |
| 8,060,678 B2 | 11/2011 | Bohm |
| 8,147,338 B2 | 4/2012 | Hutchison-Kay |
| 8,156,274 B2 | 4/2012 | Kapelner |
| 8,185,680 B2 | 5/2012 | Drexler |
| 8,185,759 B1 | 5/2012 | Li |
| 8,205,017 B2 | 6/2012 | Parr et al. |
| 8,229,301 B2 | 7/2012 | Hahin |
| 8,230,118 B2 | 7/2012 | Toba |
| 8,307,137 B2 | 11/2012 | Liao |
| 8,384,568 B2 | 2/2013 | Govindammagari et al. |
| 8,416,903 B1 | 4/2013 | Oh et al. |
| 8,478,917 B2 | 7/2013 | Scott |
| 8,485,703 B2 | 7/2013 | Eckel |
| 8,543,740 B2 | 9/2013 | Lotzenburger et al. |
| 8,582,598 B2 | 11/2013 | Binder |
| 8,600,583 B2 | 12/2013 | Fervel |
| 8,605,623 B2 | 12/2013 | Simmons et al. |
| 8,615,091 B2 | 12/2013 | Terwal |
| 8,643,290 B2 | 2/2014 | Liu |
| 8,667,194 B2 | 3/2014 | Dybsetter |
| 8,692,487 B2 | 4/2014 | Eckel |
| 8,745,305 B2 | 6/2014 | Toba |
| 8,806,083 B2 | 8/2014 | Doorenbos |
| 8,812,654 B2 | 8/2014 | Gelvin et al. |
| 8,850,079 B2 | 9/2014 | Fister |
| 8,990,464 B2 | 3/2015 | Kessler |
| 9,059,724 B2 | 6/2015 | Lahr et al. |
| 9,197,226 B2 | 11/2015 | Lahr |
| 9,417,944 B2 | 8/2016 | Kessler |
| 2005/0044431 A1 | 2/2005 | Lang et al. |
| 2005/0128962 A1 | 6/2005 | Dybsetter et al. |
| 2005/0165994 A1 | 7/2005 | Dickens |
| 2006/0005055 A1 * | 1/2006 | Potega .................. G06F 1/1632 713/300 |
| 2006/0038445 A1 | 2/2006 | Yanagida |
| 2006/0245454 A1 | 11/2006 | Balasubramanian et al. |
| 2007/0152628 A1 | 7/2007 | Lee |
| 2008/0013640 A1 | 1/2008 | Lu et al. |
| 2008/0046121 A1 | 2/2008 | Pao et al. |
| 2008/0246626 A1 | 10/2008 | Sheafor et al. |
| 2008/0250175 A1 | 10/2008 | Sheafor et al. |
| 2008/0250184 A1 | 10/2008 | Sheafor et al. |
| 2009/0021955 A1 | 1/2009 | Kuang |
| 2009/0031152 A1 | 1/2009 | Bolderl-Ermel |
| 2009/0116583 A1 | 5/2009 | Lida et al. |
| 2009/0147864 A1 | 6/2009 | Lida et al. |
| 2009/0322251 A1 | 12/2009 | Hilgers |
| 2010/0010504 A1 | 1/2010 | Simaan et al. |
| 2010/0045302 A1 | 2/2010 | Karam |
| 2010/0184575 A1 | 7/2010 | Williams et al. |
| 2010/0257303 A1 | 10/2010 | Lee et al. |
| 2011/0028150 A1 | 2/2011 | Kone |
| 2012/0093342 A1 | 4/2012 | Rupprecht et al. |
| 2012/0102249 A1 | 4/2012 | Duroiu et al. |
| 2012/0157214 A1 | 6/2012 | Hutchison-Kay |
| 2012/0219099 A1 | 8/2012 | Loukianov |
| 2012/0257680 A1 | 10/2012 | Dickens et al. |
| 2012/0275527 A1 | 11/2012 | Douglass |
| 2013/0069740 A1 | 3/2013 | Kanasugi et al. |
| 2013/0077724 A1 | 3/2013 | Dreps et al. |
| 2013/0124763 A1 | 5/2013 | Kessler |
| 2013/0215799 A1 | 8/2013 | Binder |
| 2013/0236190 A1 | 9/2013 | Tanaka et al. |
| 2013/0297829 A1 | 11/2013 | Berenbaum et al. |
| 2013/0325996 A1 | 12/2013 | Selig |
| 2014/0067103 A1 | 3/2014 | Terwal |
| 2014/0095750 A1 | 4/2014 | Talliet |
| 2014/0139140 A1 | 5/2014 | Yeh et al. |
| 2014/0186023 A1 | 7/2014 | Louderback |
| 2014/0208158 A1 | 7/2014 | Strumpf |
| 2014/0223054 A1 | 8/2014 | Hasan et al. |
| 2014/0246993 A1 | 9/2014 | Catalano et al. |
| 2014/0249695 A1 | 9/2014 | Gettings et al. |
| 2014/0281077 A1 | 9/2014 | Biskup |
| 2014/0281078 A1 | 9/2014 | Biskup |

(56) References Cited

U.S. PATENT DOCUMENTS

| 2014/0281079 | A1 | 9/2014 | Biskup |
| 2015/0009050 | A1 | 1/2015 | Lahr |
| 2015/0301968 | A1 | 10/2015 | Kessler |

FOREIGN PATENT DOCUMENTS

| CN | 100551634 C | 10/2009 |
| CN | 201744997 U | 2/2011 |
| CN | 202093392 U | 12/2011 |
| CN | 103676797 A | 9/2012 |
| CN | 202763839 U | 3/2013 |
| CN | 101944750 | 4/2013 |
| CN | 203077287 U | 7/2013 |
| CN | 203225749 U | 10/2013 |
| CN | 102615638 B | 8/2014 |
| DE | 102014109156 | 1/2005 |
| EP | 0428869 B1 | 5/1991 |
| EP | 798901 | 10/1997 |
| EP | 1844542 B1 | 10/2007 |
| EP | 2824845 | 1/2015 |
| EP | 2827222 | 1/2015 |
| ES | 2339203 | 9/2007 |
| IN | 187CHE2008 A | 8/2009 |
| JP | 2002-314552 | 10/2002 |
| JP | 2008-278179 | 11/2008 |
| JP | 2009/543279 | 12/2009 |
| JP | 2010-065667 | 3/2010 |
| JP | 2011-50000 | 3/2011 |
| JP | 2011-211673 | 10/2011 |
| JP | 2012-049681 | 8/2012 |
| JP | 2004001195 A | 1/2014 |
| KR | 100451374 | 9/2004 |
| KR | 10-2012-0068597 | 6/2012 |
| KR | 10-2014-1570610 | 11/2015 |
| WO | 01/08366 | 2/2001 |
| WO | 03/043788 A1 | 5/2003 |
| WO | 2008/001274 | 1/2008 |
| WO | 2008/114777 | 9/2008 |
| WO | 2013/052886 | 4/2013 |

OTHER PUBLICATIONS

Non-Final Office Action (Notice of Preliminary Rejection) in Korean Patent Application Serial No. 10-2014-82367 mailed Feb. 26, 2014, 4 pages.
English Summary of Non-Final Office Action (Notice of Preliminary Rejection) in Korean Patent Application Serial No. 10-2014-82367 mailed Feb. 26, 2014, 2 pages.
Notice of Allowance in Korean Patent Application Serial No. 10-2014-0082367 mailed Aug. 26, 2015, 5 pages.
English Translation of Notice of Allowance in Korean Patent Application Serial No. 10-2014-0082367 mailed Aug. 26, 2015, 1 page.
Ex-Parte Quayle Office Action in U.S. Appl. No. 14/132,625 mailed Jul. 2015, 8 pages.
Notice of Allowance in U.S. Appl. No. 14/132,635 mailed Jul. 27, 2015, 5 pages.
Notice of Publication of Application for European Patent Application Serial No. 14175269.1 dated Jan. 21, 2015, 2 pages.
Notice of Preliminary Rejection issued in KR Patent Application Serial No. 2014-83823 mailed Aug. 18, 2015, 5 pages.
English Translation of Notice of Preliminary Rejection issued in KR Patent Application Serial No. 2014-83823 mailed Aug. 18, 2015, 3 pages.
Non-Final Office Action issued in U.S. Appl. No. 13/646,397 mailed Oct. 8, 2015, 16 pages.
Non-Final Office Action in U.S. Appl. No. 13/646,382 mailed Jul. 2, 2014, 11 pages.
Notice of Allowance in U.S. Appl. No. 13/646,382 mailed Nov. 25, 2014, 5 pages.
Office Action in EP12779236.4 mailed Jun. 2, 2014, 2 pages.

International Search Report in PCT/US2012/059084 mailed Oct. 4, 2013, 5 pages.
Office Action in Japan Patent Application Serial No. 2014-534801 mailed Jan. 23, 2015, 4 pages.
English Translation of Japan Patent Application Serial No. 2014-534801 mailed Jan. 23, 2015, 5 pages.
Office Action in Japan Patent Application Serial No. 2014-534801 mailed Jul. 7, 2015, 5 pages.
English Translation of Japan Patent Application Serial No. 2014-534801 mailed Jul. 7, 2015, 7 pages.
Japanese Divisional Patent Application Serial No. 2015-162593 filed Aug. 20, 2015.
PCT Application Serial No. PCT/US2014/050787 filed Aug. 12, 2014.
"The Malfunction Vehicle Bus (MVB)", IEEE *Xplore* Digital Library, IEEE Standards, IEEE Spectrum, IEEE Explore Abstract, Dec. 1, 2014, 2 pages.
English Translation of Korean Patent Publication KR100451374 entitled "The Improvement Apparatus and Method of the Communication Speed and Reliability for Backplane Using a Parallel Bus" [FR under Foreign tab in this IDS worksheet].
Liu, Heng et al., "Vehicle Network Communication Protocols—Comparison and Case Study", http://www.paper.edu.cn, 7 pages.
Pranay Saraf et al., "The Traditional and New Generation in-vehicle Networks in Automotive Field", Proc. of Intl. Conf. on Advances in Computer, Electronics and Electrical Engineering © 2012 Universal Association of Computer and Electronics Engineers, ISBN: 978-981-07-1847-3, pp. 535-540, 6 pages.
English Translation of Chinese Patent Publication CN100551634C entitled, "Control System for Modular Robot Based on CAN Bus", 12 pages [FR under Foreign tab in this IDS worksheet].
English Translation of Chinese Patent Publication CN102615638B entitled, "High-Voltage Charged Working Robot Master-Slave Hydraulic Mechanical Arm System", 10 pages [FR under Foreign tab in this IDS worksheet].
English Translation of Chinese Patent Publication CN103676797A entitled, "Modullarized Sub-Action Multi-Legged Robot Motion Controller and Control Method Thereof", 15 pages [FR under Foreign tab in this IDS worksheet].
English Translation of Chinese Patent Publication CN200944109Y entitled, "Poisonous Gas Network Intelligent Sensor", 5 pages.
English Translation of Chinese Patent Publication CN201744997U entitled, "Modularized Portable Mobile Robot System", 7 pages.
English Translation of Chinese Patent Publication CN202763839U entitled, "Programmable Automation Controller (PAC) Industrial Robot Control System Based on Field Bus", 10 pages.
English Translation of Chinese Patent Publication CN203077287U entitled, "Master-Slave Mode Hydraulic Pressure Feedback Mechanical Arm Controlling System of Charged Repair Robot", 9 pages.
English Translation of Spanish Patent Publication ES2339203A1 entitled, "Compatible Apparatus Domotico with the Standard Celenec in 50090 and ISO/IEC 14543 for the Control of Chambers Robotics", 2 pages.
English Translation of Japanese Patent Publication No. JP2004001195A entitled, "Robotic Device", 18 pages.
English Translation of Korean Patent Publication KR10-2012-0068597 entitled, "Surgical Robot System and Adaptive Control Method Thereof", 39 pages.
English Translation of International Patent Publication WO03043788A1 entitled, "Two-Legged Walking Type Human-Shaped Robot", 11 pages.
English Translation of Chinese Patent Publication CN101944750B entitled, "Implementation Method of Flexible Intelligent Direct Current Electric Local Area Network Electric Power System", 11 pages.
English Translation of Chinese Patent Publication CN201196834Y entitled, "Industrial Frequency Communication System of Power Distribution Network", 7 pages.
English Translation of Chinese Patent Publication CN202093392U entitled, "Hardware Platform of AGV (Automated Guided Vehicle) System", 10 pages.

(56) References Cited

OTHER PUBLICATIONS

English Translation of Chinese Patent Publication CN203225749U entitled, "Master-Slave Both-Way Communication System", 4 pages.
English Translation of Japanese Patent Publication No. JP2011050000A entitled, "Communication Centralized Control System and Communication Centralized Control Method", 22 pages.
OA1 issued in CN Patent Application Serial No. 201410323230.1 mailed Jan. 4, 2016 including English Summary of Relevance, 7 pages.
Notice of Last Preliminary Rejection issued in KR Patent Application Serial No. 10-2014-0083823 mailed Feb. 28, 2016, 5 pages.
English Translation of Notice of Last Preliminary Rejection issued in KR Patent Application Serial No. 10-2014-0083823 mailed Feb. 28, 2016, 4 pages.
EP Search Report issued in EP Patent Application Serial No. 14175269.1 mailed Sep. 8, 2015, 6 pages.
U.S. Appl. No. 61/843,891 entitled "A2B Protocol Engine" filed Jul. 8, 2013, 14 pages.
U.S. Appl. No. 14/063,886 entitled "Two-Wire Communication Protocol" filed Oct. 25, 2013, 37 pages.
U.S. Appl. No. 61/843,896 entitled "Digital Phase Detector" filed Jul. 8, 2013, 16 pages.
U.S. Appl. No. 14/132,635 entitled "Digital Phase Detector" filed Dec. 18, 2013, 29 pages.
U.S. Appl. No. 61/843,902 entitled "Differential Decoder" filed Jul. 8, 2013, 12 pages.
U.S. Appl. No. 61/845,542 entitled "System and Method for Implementing A2B Protocol" filed Jul. 12, 2013, 295 pages.
U.S. Appl. No. 13/646,397 entitled "Two-Wire Communication System for High Speed Data and Power Distribution" filed Oct. 5, 2012. [number of pages unavailable].
U.S. Appl. No. 13/646,382 entitled "Methods for Discovery, Configuration, and Coordinating Data Communications Between Masters and Slave Devices in a Communication System" filed Oct. 5, 2012, 122 pages.
Response to Extended Search Report for European Patent Application Serial No. 14173943.3 filed Jul. 13, 2015.
Response to Preliminary Rejection issued in KR Patent Application Serial No. 2014-0083823 filed Oct. 19, 2015.
1st Office Action issued in Chinese Patent Application Serial No. 20128005576.7 mailed Dec. 3, 2015, 22 pages.
Response to JP Office Action issued in JP Patent Application Serial No. 2014-534801 filed Apr. 23, 2015, 20 pages.
English Translation of as-filed Amended Claim in Response to Office Action issued in JP Patent Application Serial No. 2014-534801 filed Apr. 23, 2015, 18 pages.
Notice of Allowance in JP Patent Application Serial No. 2014-534801 mailed Nov. 11, 2015, 3 pages [Japanese].
Summary of Relevance, together with Office Action issued in CN Patent Application Serial No. 201410323230.1 mailed Jun. 27, 2016, 4 pages.
OA1 (NFOA) issued in U.S. Appl. No. 14/102,603 mailed Aug. 16, 2016, 19 pages.
OA2 issued in CN Patent Application Serial No. 201410323230.1 mailed Jun. 27, 2016 including English Summary of Relevance, 4 pages.

\* cited by examiner

POWER SWITCHING IN A TWO-WIRE CONDUCTOR SYSTEM

CROSS-REFERENCE TO RELATED APPLICATIONS

This application claims the benefit of priority under 35 U.S.C. §119(e) to U.S. Provisional Application Ser. No. 61/843,891, entitled "A²B Protocol Engine" filed Jul. 8, 2013, U.S. Provisional Application Ser. No. 61/843,896, entitled "Digital Phase Detector" filed Jul. 8, 2013, U.S. Provisional Application Ser. No. 61/843,902, entitled "Differential Decoder" filed Jul. 8, 2013, U.S. Provisional Application Ser. No. 61/845,542, entitled "System and Method for Implementing A²B Protocol" filed Jul. 12, 2013, which are hereby incorporated by reference in their entireties. This application is also a continuation-in-part and claims the benefit of priority under 35 U.S.C. §120 of U.S. application Ser. No. 13/646,397, filed Oct. 5, 2012, entitled "Two-Wire Communication System for High Speed Data and Power Distribution" and U.S. application Ser. No. 13/646,382, filed Oct. 5, 2012, entitled "Methods for Discovery, Configuration, and Coordinating Data Communications Between Masters and Slave Devices in a Communication System." The disclosures of the prior applications are considered part of and are incorporated by reference in the disclosure of this application.

TECHNICAL FIELD OF THE DISCLOSURE

The present disclosure relates generally to communication bus technology and, more particularly, to power switching in a two-wire conductor system.

BACKGROUND

Two-wire conductor systems are known in electrical and electronics fields as a means of data and power transmission. Such systems typically employ a controller that drives power into two wire conductors, controls the timing of data transfer and transmits and receives data. A master chip (also called a master node) is controlled by the controller, and the master node in turn controls one or more slave chips (also called slave nodes). As used herein, a "chip" includes a complex set of electronic components and their interconnections etched or imprinted onto semiconducting material to form an integrated circuit. Generally, communication on the two-wire conductor system involves sending a clock signal on one wire and data signal on the other wire, with the rise and/or fall of the clock signal indicating data transfer between the connected chips. Two-wire conductor systems can be used in myriad applications, such as control systems in automobiles, audio signal processing, telephony, etc.

OVERVIEW

The present disclosure relates generally to power switching in a two-wire conductor system. Specifically, proliferation of sensors, such as microphones, cameras, etc. in automobiles (and other such closed and/or mobile systems that utilize sensors and other peripheral chips) can lead to excessive amount of wiring, with consequent increase in system complexity and weight, and potential decrease in performance and reliability. A particular type of two-wire communication, called automobile audio bus (A²B) communication, can be used in automobiles and other similar systems to reduce complexity of data and power transmission across the various sensors and sensor control chips.

The A²B bus comprises a pair of twisted wires that provides a multi-channel, Inter-Integrated Circuit sound (I²S)/time division multiplexed (TDM) link between connected nodes. It embeds bi-directional synchronous data (e.g., digital audio), clock and synchronization signals onto a single differential wire pair. A²B supports a direct point-to-point connection and allows multiple, daisy chained nodes at different locations to contribute or consume TDM channel content. The A²B bus allows time for downstream traffic (e.g., from the master node to the last slave node) and upstream traffic (e.g., to the master node) and allows power transmission over the same twisted wire pair.

Discovery process in the A²B protocol includes powering up and establishing upstream communication successively from one A²B chip to the next downstream A²B chip in the connected A²B daisy chain. Each A²B chip may appropriately enable power to the next downstream A²B chip without risk of damage to any components in the system from line faults (or other errors) on the downstream A²B cable. In addition, the enabling of the next downstream A²B chip would not collapse the power supply of the local A²B chip (which can otherwise interrupt upstream data and control communication).

In an example embodiment, a power switching circuit of an A²B chip is provided in a bi-directional, multi-node two-wire conductor system that includes a plurality of A²B chips interconnected on a twisted wire pair bus (A²B bus), with at least one A²B chip functions as a master and the remaining A²B chips function as slave. The power switching circuit of the A²B chip powers up a next downstream A²B chip in the A²B bus sequentially according to a power switching procedure. The power switching circuit is configured to detect faults in the A²B bus before, during, and after the power switching procedure.

DESCRIPTION OF EXAMPLE EMBODIMENTS OF THE DISCLOSURE

Figure 1:
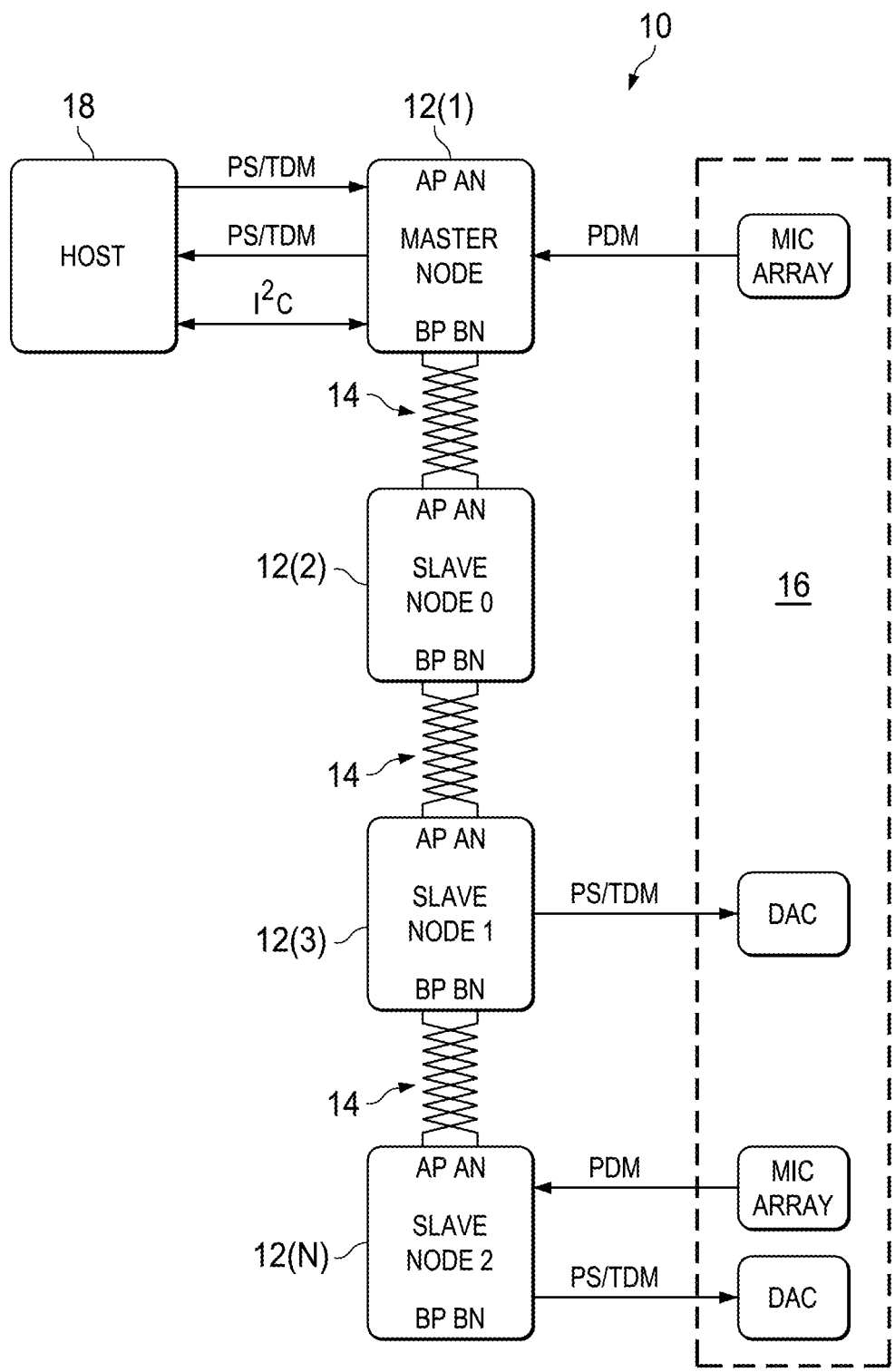
FIG. 1 is a simplified block diagram illustrating an example schematic for power switching in a two-wire conductor system.

FIG. 1 is a simplified block diagram illustrating a two-wire conductor system 10. System 10 comprises a plurality of nodes 12(1)-12(N). 12(1) represents a master node, which communicates with a plurality of slave nodes 12(2)-12(N) over an A²B bus 14 using a two-wire communication protocol (e.g., A²B protocol). Each slave node 12(2)-12(N) may read and/or write data from/to one or more sensors or other peripheral chips 16. Examples of peripheral chips include microphones (mics), mic arrays, digital to analog converters (DACs), etc. A host controller 18 may communicate with and control master node 12(1) over multi-channel I$^2$S and Inter-Integrated Circuit (I$^2$C) communication protocols. Embodiments of system 10 may allow for control information and audio data to be transmitted in both directions using A$^2$B bus 14 to connect each node to the next one. Slave nodes 12(2)-12(N) can also be powered by A$^2$B bus 14.

Master node 12(1) comprises an originator of a clock signal (e.g., which can be derived from an I$^2$S input), downstream data, network control and power; the master node is programmed by host controller 18 (e.g., microprocessor), and it receives/sends payload to/from host controller 18. Each slave node 12(2)-12(N) comprises an addressable network connection point that can represent a possible destination for downstream data frames (e.g., single block of payload of a specific node with possibly multiple synchronous data slots of content) and source of upstream data frames. Synchronous data refers to continuously streamed data (e.g., audio signal) in which a fixed time interval (e.g., 48 kHz) and a fixed phase spaces two corresponding transitions.

According to various embodiments, each A$^2$B chip 12(1)-12(N) may be connected to a corresponding power switching circuit, wherein a portion of the power switching circuit may be located within respective A$^2$B chip 12(1)-12(N), and the remaining portion of the power switching circuit maybe located outside respective A$^2$B chip 12(1)-12(N). The power switching circuit of each A$^2$B chip 12(1)-12(N) may enable power to the next A$^2$B chip on A$^2$B bus 14. Each A$^2$B chip 12(1)-12(N) may be enabled sequentially (e.g., one at a time) and each A$^2$B chip may default at power up to be isolated from the next downstream A$^2$B chip. Such discovery process may be enabled by a power switch implemented in a portion of the power switching circuit at each A$^2$B chip 12(1)-12(N). According to an embodiment of system 10, enabling power on a cable of A$^2$B bus 14 may be accomplished without permanent damage to any associated circuitry, while maintaining existing power and communication connections and reporting any downstream cabling faults. Reporting of faults may include localization of the fault detected and classification of the fault type.

In various embodiments, the power switch can control downstream voltage power to the next downstream A$^2$B chip in the A$^2$B chain (e.g., group of A$^2$B chips 12(1)-12(N) connected by A$^2$B bus 14). The power switch can be activated by internal logic of each slave node 12(2)-12(N) after being programmed appropriately by upstream master node 12(1). The power switch can also control a process of switching on each downstream A$^2$B chip 12(2)-12(N) such that a local power (e.g., as measured by voltage at a particular pin, such as VIN) at each A$^2$B chip 12(2)-12(N) does not drop out of a pre-determined range of values during the power-up transition.

In various embodiments, specific checks (e.g., tests, troubleshooting, etc.) may be performed for certain line fault conditions before enabling power on each A$^2$B chip 12(2)-12(N). For example, cables connecting A$^2$B chips 12(2)-12(N) may be exposed to the outside environment (e.g., air, water, humidity, temperature differentials, mechanical shock, etc.) and may experience faults. Part of the switching mechanism, including the line power supply, can sense the faults, automatically withdraw power to downstream components, and report the fault through A$^2$B bus 14. Thus, according to various embodiments, faults in the A$^2$B chain may be detected early enough (e.g., during powering up) to prevent subsequent system failures (e.g., electrical collapse of downstream cables, etc.). After the power on transition is successfully completed, the power switch can indicate completion status back to master node 12(1) and host controller 18 through one or more appropriate status flags.

In an example embodiment, a feature list of the power switch can include low power-on with internal laterally diffused metal oxide semiconductor (LDMOS) chip; a maximum switched current of 400 mA; a maximum on resistance of less than 1.2Ω; output short circuit protection; and input overvoltage protection to support VIN shorted to VBAT (e.g., pin connected to battery voltage) in system 10. It may be noted that although only a few A$^2$B chips 12(1)-12(N) are shown herein for sake of simplicity, any number of A$^2$B chips may be interconnected in a similar manner within the broad scope of the embodiments of system 10. Moreover, each slave node 12(2)-12(N) may communicate with any number of peripheral chips within the broad scope of the embodiments.

Figure 2:
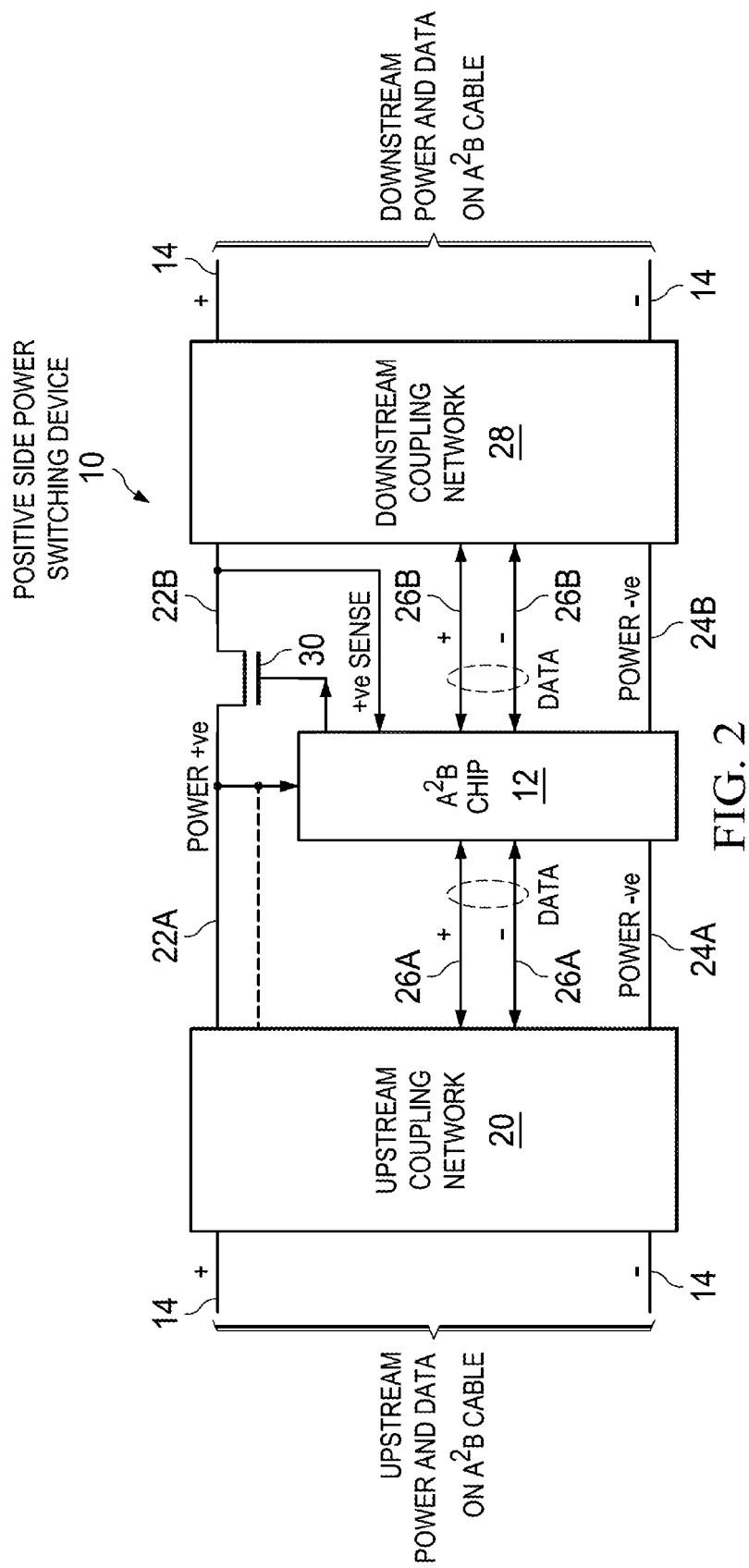
FIG. 2 is a simplified block diagram illustrating example details of an embodiment of the system.

Turning to FIG. 2, FIG. 2 is a simplified block diagram illustrating example details of a power switching circuit according to an embodiment of system 10. In various embodiments, system 10 may include an example A$^2$B chip 12 (e.g., slave node or master node) configured to receive data and power over A$^2$B bus 14. The power switching circuit of A$^2$B chip 12 powers up a next downstream A$^2$B chip in A$^2$B bus 14 sequentially according to a power switching procedure. As used herein, the term "upstream" in connection with example A$^2$B chip 12 refers to a portion of the A$^2$B chain directed towards the master A$^2$B chip; the term "downstream" in connection with example A$^2$B chip 12 refers to a portion of the A$^2$B chain directed away from example A$^2$B chip 12 and the master A$^2$B chip. Power flows from the upstream direction towards the downstream direction during the power switching procedure.

In various embodiments, the power switching circuit is configured to detect faults in A$^2$B bus 14 before, during, and after the power switching procedure. In some embodiments, the power switching circuit can sense a condition of a downstream cable (e.g., cable, line, etc. connected to the next downstream A$^2$B chip) of A$^2$B bus 14 before, during and after the power switching procedure, and to provide feedback to a switch control mechanism. The power switching circuit can gradually charge the downstream cable and the downstream A$^2$B chip while substantially simultaneously preserving local power and data communication and providing a bounded charging time for the downstream A$^2$B chip. For example, the power switching circuit can maintain a local power supply voltage during the power switching procedure. The power switching circuit can enable power to the downstream A$^2$B chip on command from the master A$^2$B chip. In some embodiments, the power switching circuit is configured to successfully conclude the power switching procedure if no faults are detected on the downstream cable.

An upstream coupling network 20 may separate power supply lines from and data lines on an A$^2$B bus cable and supply the power and data separately to A$^2$B chip 12 over power supply lines 22A and 24A (upstream positive power supply line and negative power supply line, respectively) and upstream data line 26A, respectively. The upstream power and data may be forwarded by, or originate from, the master A$^2$B chip. A downstream coupling network 28 may be configured to aggregate the power and data signals from A$^2$B chip 12 on downstream power supply lines 22B and 24B (downstream positive power supply line and negative power supply line, respectively) and downstream data line 26B and provide the aggregated signal over another A²B bus cable to downstream components (which can include other A²B chips).

A power switch 30 may be provided on downstream positive power supply line 22B. In the example embodiment illustrated herein, power switch 30 includes a transistor controlled by A²B chip 12, and a power sense line that facilitates sensing power flowing towards downstream coupling network 28 (e.g., as a feedback mechanism to determine how the line responds to the switching of power). Power switch 30 facilitates isolating downstream coupling network 28 during powering-on of A²B chip 12. Thus, in specific embodiments, when power switch 30 is enabled (e.g., connected), power switching may be enabled for the next downstream A²B chip; when disabled, power switch 30 may be configured to isolate A²B chip 12 being powered up from the next downstream A²B chip.

According to various embodiments, A²B chip 12 may be commanded (e.g., through a suitable control mechanism, such as a control bit) to power-on downstream components after A²B chip 12 is powered on. According to the power switching procedure, example A²B chip 12 may power up first, during which it is isolated from downstream coupling network 28. After A²B chip 12 powers up successfully, A²B chip 12 may cause the next downstream A²B chip to power up. During the power-on transition of the next downstream A²B chip, the power switching circuit of example A²B chip 12 may monitor the downstream cable for faults and stop the power switching procedure if faults are detected. The sequence of powering up can continue down the A²B chain sequentially, until substantially all A²B chips on the A²B chain have been powered up.

Upstream coupling network 20 and downstream coupling network 28 can include ferrite beads, inductors, capacitors, common mode chokes, and other electrical components that facilitate electromagnetic compatibility, tolerance for environmental conditions (e.g., in an automobile), and other desirable features, based on particular needs. Components in upstream coupling network 20 and downstream coupling network 28 may vary depending on the specific application wherein system 10 is used. Embodiments of system 10 may program A²B chip 12 to enable power to the next downstream A²B chip (if one exists) according to the power switching procedure.

Figure 3:
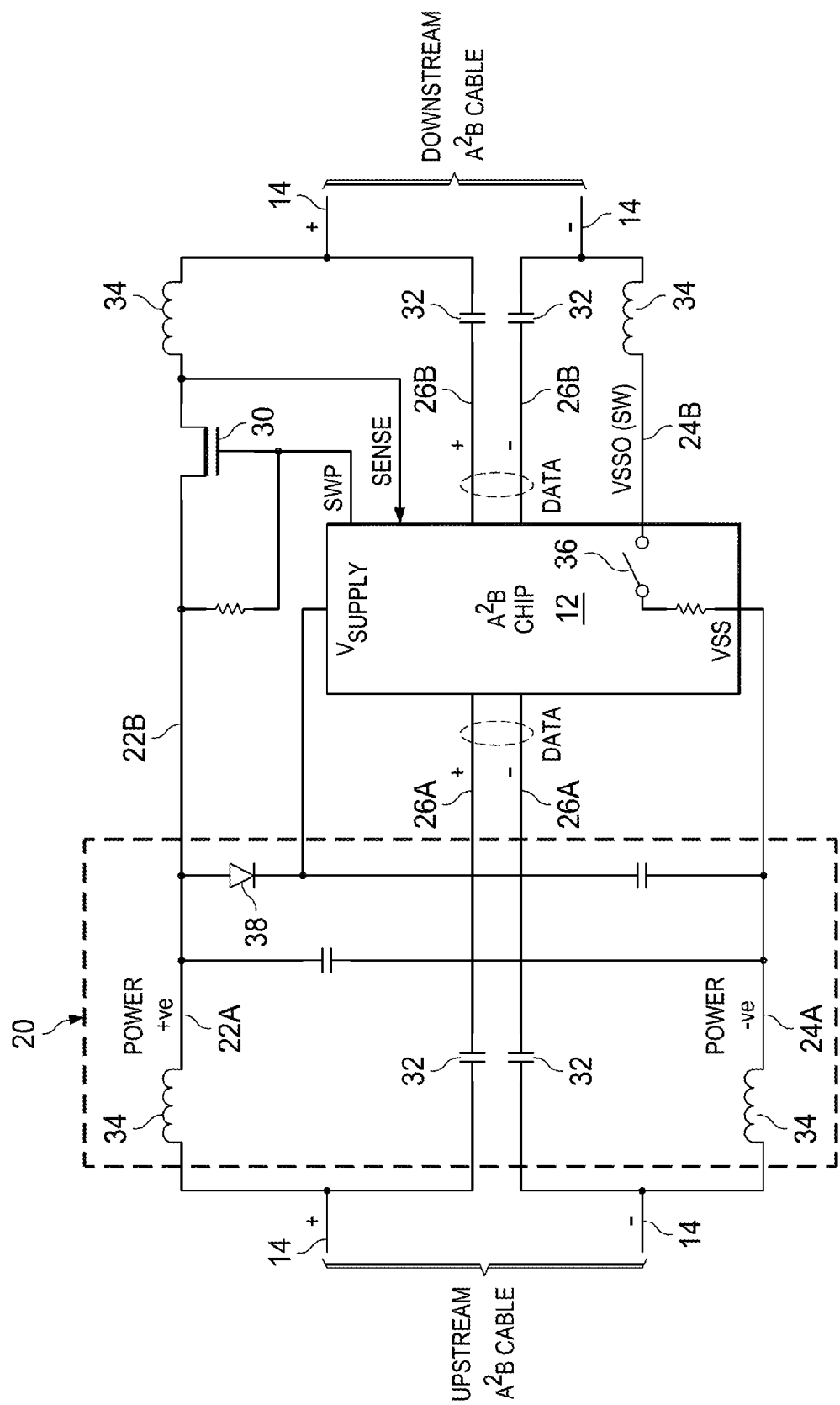
FIG. 3 is a simplified block diagram illustrating other example details of an embodiment of the system.

Turning to FIG. 3, FIG. 3 is a simplified block diagram illustrating example details of the line power supply according to an embodiment of system 10. Various embodiments of system 10 can also include switches and switch control circuitry coupled to the downstream electrical cables to enable power on the downstream A²B chips on command. Switches may be provided on positive and negative terminals (e.g., along positive power supply line 22A/22B and negative power supply line 24A/24B). Incoming power and data signals may be communicated to A²B chip 12 over A²B bus 14. Upstream coupling network 20 can include inductors (e.g., or ferrite beads) 34, which may facilitate separating out a direct current (DC) component (e.g., power component) of the incoming signals, and capacitors 32, which may facilitate separating out a high frequency (e.g., data) component of the incoming signals. For example, inductors 34 may act as high frequency blocks (e.g., filtering out high-speed data energy on twisted pair wire 14), and capacitors 32 may as low frequency blocks (e.g., filtering out power on twisted pair wire 14). Positive power supply line 22A/22B may carry (e.g., transmit, conduct, etc.) the positive portion (e.g., portion of power signal having positive polarity) of the power signal, and negative power supply line 24A/24B may carry the negative portion (e.g., portion of power signal having negative polarity) of the power signal. Data signals may be carried on data line 26A/26B (upstream/downstream, respectively).

In an example embodiment, A²B chip 12 may include a 27V tolerant open drain output pin SWP, which can pull low at an appropriate time in the power switching procedure sequence to turn on power switch 30. A current controlled switching element 36 integrated into A²B chip 12 may facilitate sensing power on downstream negative power supply line 24B. As used herein, the term "current controlled switching element" includes a semiconductor device (e.g., transistor) in which a controlling bias sets a resistance of the device at either a very high or very low value, corresponding to the "off" and "on" conditions of a switch; the resistance may vary with the control current when the switch is between the "off" and "on" position. Current controlled switching element 36 may electrically connect pin VSS to pin VSSO (also referred to as SW). A ground element may be attached to current controlled switching element 36 as appropriate.

In some embodiments, power switch 30 may comprise a P-type metal-oxide-semiconductor (PMOS) transistor, and current controlled switching element 36 may comprise an N-type metal-oxide-semiconductor (N MOS) transistor. Additional suitable electrical components may also be included within the broad scope of the embodiments. Current controlled switching element 36 may function as a switch in some scenarios, for example, functioning as a short when current exceeds a specific value, or as an open when current is below a specific threshold, or vice versa. Current controlled switching element 36 may facilitate gradually bringing up the charging current (e.g., current used to power the downstream A²B chip). In some embodiments, current controlled switching element 36 may be placed in downstream positive supply line 22B, and power switch 30 may be moved internally to A²B chip 12. An optional diode 38 connected between positive power supply line 22A and negative power supply line 24A may provide reverse current protection for A²B chip 12. Diode 38 may also facilitate detecting reverse current in system 10 in various embodiments.

In some embodiments, both switches (e.g., power switch 30 and current controlled switching element 36) may be current controlled. In yet other embodiments, power switch 30 may be current controlled, and current controlled switching element 36 may be a regular (e.g., ordinary, not current controlled) switch. At least one (possibly both) of the switches can also double as current sources during power-on transition to ensure a gradual turning on of the switches. The control of the current can be implemented as logic control at digitally controlled current source, which can dynamically adapt to the load on the line until an optimum charging rate is achieved, for example, to balance a gradually charge the downstream power supply lines and A²B chips while preserving local power and data communication, while also providing a bounded charging time for the next A²B chip to expedite the discovery process of the entire data link chain.

According to some embodiments, pins SW (connected to current controlled switching element 36) and SWP (connected to power switch 30) may operate in one of at least four operating modes according to a signal (e.g., value of a bit called sw_mode) that indicates whether A²B chip 12 is using an external switch. Merely as examples, and not as limitations, when sw_mode is set to a default value of 0, internal and external switches may be controlled by pin SWP to provide complete line isolation for line fault diagnostics and localization; when sw_mode is set to a value of 1, open and reverse wire diagnostics on the downstream cable may be skipped; when sw_mode is set to a value of 2, an external regulator may be used, and certain line diagnostic capabilities may be disabled; when sw_mode is set to a value of 3, $A^2B$ chip 12 may be set to a reserved engineering debug and test mode, wherein diagnostics are turned off, and switches are connected by fully turning on internal switch on SW and pulling SWP low to turn on the external power switch 30, following an otherwise normal switching sequence in the power switching procedure. Suitable values and operating modes for signals controlling power switch 30 and current controlled switching element 36 may be included within the broad scope of the embodiments of system 10.

According to some embodiments, appropriate status flags may be set to indicate specific events in the power switching procedure. For example, a first flag (e.g., start flag) may be set from low (e.g., 0) to high (e.g., 1) to indicate a start of power switching; a second flag (e.g., completion flag) may be set high to indicate a completion of power switching; and a third flag (e.g., fault flag) may be set high to indicate a fault. In an example embodiment, the fault flag may transition to high when the power switching procedure fails to successfully complete. If activated, it may remain high until the start flag is brought low. The completion flag may transition to high when the power switching procedure completes successfully, and may remain high until the start flag goes low (e.g., indicating that the downstream cable is disconnected).

According to some embodiments, suitable fault-codes may be set on a fault-code bus to indicate a specific fault type. For example, a fault-code of 0 may indicate no fault detected; a fault-code of 1 may indicate that the downstream cable is shorted to ground; a fault-code of 2 may indicate that the downstream cable is shorted to the battery voltage; a fault-code of 3 may indicate that the cable terminals are shorted together; a fault-code of 4 may indicate an open circuit; a fault-code of 5 may indicate that the downstream cable is reverse connected; a fault-code of 6 may indicate an indeterminate fault; etc. Various fault-code settings may be implemented within the broad scope of the embodiments.

According to some embodiments, a suitable auto-disconnect flag setting may facilitate automatically disconnecting power switch 30 when a hazardous fault is detected. The hazardous fault may be destructive to either local $A^2B$ chip 12, or the next downstream $A^2B$ chip 12 that is being powered up. In an example embodiment, if a fault is detected when the auto-disconnect flag is enabled (e.g., set to 1) and power switch 30 is actively connected, then power switch 30 may be disconnected, the completion flag (e.g., to indicate power switching completion) may go low, the fault flag (e.g., to indicate a fault) may transition to high with the appropriate fault-code set on the fault-code output bus. On the other hand, if the auto-disconnect flag is disabled (e.g., set to 0) when a fault is detected, the completion flag may remain high as power switch 30 may continue to remain connected. The fault flag and fault-code outputs may be updated with the fault information, but the disconnecting of power switch 30 may be controlled by host 18, user intervention, software intervention, or other mechanisms.

Figure 4:
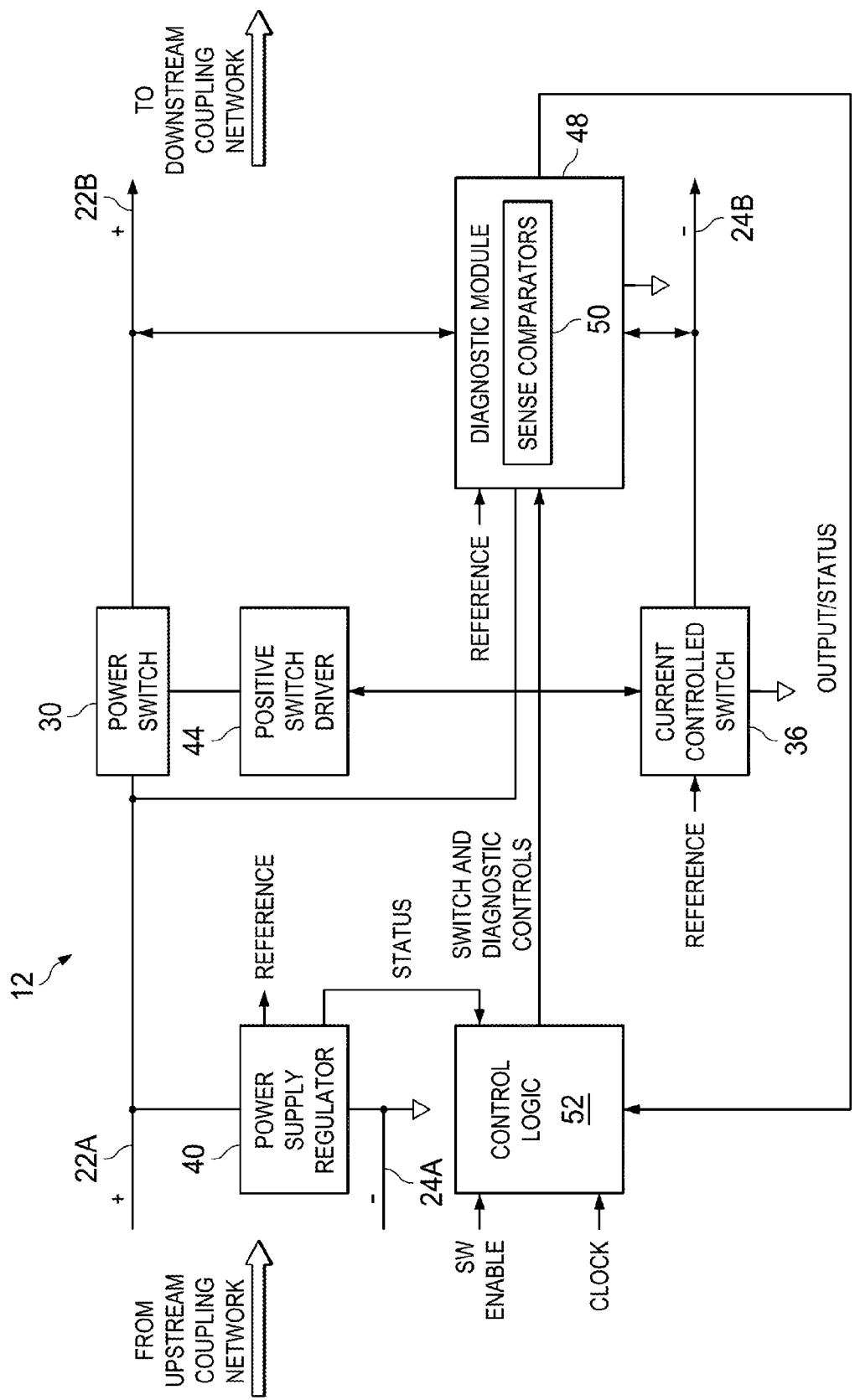
FIG. 4 is a simplified block diagram illustrating yet other example details of an embodiment of the system.

Turning to FIG. 4, FIG. 4 is a simplified block diagram illustrating a power switching and diagnostic hardware associated with $A^2B$ chip 12 according to various embodiments. A power supply regulator 40 may sense any problems (e.g., drop in voltage) in incoming (e.g., from upstream direction) power supply lines 22A and 24A. Power switch 30 on downstream positive power supply line 22B may be driven by a positive switch driver 44. Current controlled switching element 36 on downstream negative power supply line 24B may function as a variable negative current sink and switch (and current source in some embodiments) to regulate current.

A diagnostic module 48 including one or more sense comparators 50 and other components may facilitate detecting faults in downstream $A^2B$ bus 14 before, during and after the power switching procedure. A control logic 52 may control a current source (e.g., current controlled switching element 36) to dynamically adapt a charging current to a load on $A^2B$ bus 14 until a pre-determined charging rate is achieved. Control logic 52 may receive various status inputs from power regulator 40 and diagnostic module 48, appropriately determine a suitable power-on switching mechanism, and accordingly generate switch and diagnostic controls to facilitate power switching and line diagnostics in system 10.

According to various embodiments, switch enable and clock signals from other components in $A^2B$ chip 12 may facilitate configuring (e.g., programming, controlling, etc.) control logic 52. Control logic 52 may control power switch 30 through positive switch driver 44. When power switch 30 is turned on, the upstream power supply may be connected to the downstream power supply, energizing a current loop (comprising positive power supply line 22B and negative power supply line 24B through the next downstream $A^2B$ chip) gradually without causing a current surge or other disruptions. Sense comparators 50 may feedback a status of downstream power supply lines 22B and 24B with respect to the incoming supply and ground to control logic 52. Control logic 52 may make a next state decision based on a state of power switch 30, current drawn through current controlled switching element 36, and status of sense comparators 50.

Power supply regulator 40 may monitor a status (e.g., quality, health, condition, etc.) of incoming power supply. If the quality of incoming power supply is degraded, appropriate feedback of the status of the local power supply at $A^2B$ chip 12 may be provided to control logic 52. Thus, if the power supply starts to collapse (e.g., power surge, no power, power fluctuations, etc. on power supply lines), the degradation may be detected sufficiently early, so that the power-on process can be slowed down (or stopped, as appropriate) to permit the power supply degradation to settle (e.g., stop, disappear, quiet down, etc.). For example, power supply regulator 40 may monitor voltage at pin VIN and provide feedback to control logic 52 if the value of VIN droops below a pre-configured threshold. Downstream power supply and data may be thus protected from problems (e.g., disruptions, collapse, etc.) in the local power supply.

In various embodiments, diagnostic module 48 may be configured to sense a condition of the downstream cable before, during, and after a power switching process, for example, to detect faults that could damage circuitry if power is enabled and also to feedback information to control logic 52 during the downstream power enabling transition. Diagnostic module 48 may be tolerant to high line voltages that can exist on the downstream cable during various fault conditions.

Diagnostic module 48 can be connected to both the upstream and downstream sides. Diagnostic module 48 can be controlled by control logic 52 conditional to requirements of the power switching procedure. Diagnostic module 48 can provide upstream and downstream power supply status information back to control logic 52 if indicating successful completion of a step in the power switching procedure or failure of such a step indicating a potential fault in the downstream network. Diagnostic module 48 may monitor the status of the upstream and downstream power supply lines 22A/22B and 24A/24B before, during, and/or after the downstream power switching procedure.

In some embodiments, diagnostic module 48 can detect potentially destructive faults prior to enabling power delivery to the downstream network. For example, the downstream cable may be excited with a voltage excitation through a moderate resistance on two terminals of the downstream network, and a response can be sensed by sense comparators 50 that detect (e.g., observe, measure, etc.) the excitation on the downstream cable. A fault such as a short circuit to ground or a high voltage may overpower the excitation, which may then not be detected by sense comparators 50. Depending on the signature of the output from sense comparators 50, the nature of the fault may be appropriately classified or determined. If a destructive fault is detected, the process of powering the downstream network may be stopped, and the presence and type of the fault reported back to host 18.

In some embodiments, diagnostic module 48 can also detect an open circuit fault by comparing a downstream cable state to an upstream cable state. For example, if a far end downstream load is not present, which in turn could indicate an open circuit or reverse connection type fault, the downstream cable state may reach the upstream cable state too quickly (e.g., in less than a pre-determined time interval). Appropriate sense comparators 50 may detect a rate of change of the downstream cable state, and detect if the downstream cable state may reach the upstream cable state too quickly, indicating the open circuit fault.

In some embodiments, diagnostic module 48 may classify other faults by exciting power supply lines 22B and 24B in a reverse polarity manner. If the downstream power supply lines 22B and 24B charge too quickly (e.g., in less than a pre-determined time interval) when reverse polarized, an open circuit may be indicated. On the other hand, if the downstream power supply lines 22B and 24B respond too slowly (e.g., in more than the pre-determined time interval) to the reverse polarity excitation, as indicated by the downstream cable state sensed by appropriate sense comparators 50, a reverse polarity fault may be indicated.

In some embodiments, a short circuit fault may be diagnosed if sense comparators 50 indicate that the downstream power supply lines 22B and 24B were not completely charged within a pre-determined elapsed time interval at a maximum charging current. Any status indication either from a local power regulator circuit or sense comparators 50 may indicate that the upstream (e.g., incoming) power supply levels have dropped below acceptable operating levels. Using gradually increasing currents to energize the downstream $A^2B$ chip may allow for a safe detection of short circuit before any of the circuit elements involved are damaged.

In various embodiments, diagnostic module 48 can also continue to monitor the downstream power supply lines 22B and 24B after successful completion of the downstream power switching procedure, for example, by leaving sense comparators 50 connected to downstream power supply lines 22B and 24B. Sense comparators 50 can indicate any deviation of the downstream power supply voltage levels outside of pre-determined acceptable limits.

In various embodiments, power supply regulator 40 can provide feedback on a status of the local power supply, for example, so the downstream power switching procedure can be suspended or slowed down if a dynamic scaling of the charging current starts to impact the viability of the local power supply. According to various embodiments, control logic 52 can control current controlled switching element 36 while monitoring a status of the downstream power supply lines 22B and 24B as indicated by sense comparators 50 and a status of a local power regulator, if any. Control logic 52 may also report successful conclusion of the power switching procedure or detection of a classified fault to a data link system (e.g., electrical circuit separated from the power supply circuit). In some embodiments of system 10, control logic 52 can be implemented as a digital circuit for the control of switching of power on to downstream power supply lines 22B and 24B. In alternate embodiments, an equivalent analog control circuit may be used.

When enabling the next downstream $A^2B$ chip, a step may include activating power switch 30 (e.g., by enabling the start flag, for example, by setting it from 0 to 1). Power switch 30 may be controlled by control logic 52 so that the local power supply (VOUT33/VOUT) which is derived from VIN, may not droop out of specification (e.g., as it can jeopardize the upstream communication link). During the power switching procedure, it is likely that VIN voltage may drop in a controlled manner, although avoiding a voltage regulator brown out condition. At the completion of the power switching procedure, the completion flag may transition to high.

Diagnostic module 48 may detect a faulty downstream cable and provide appropriate feedback to control logic 52. Control logic 52 may report back (e.g., to the master node or host 18, as appropriate) a failed attempt to turn on power switch 30, for example, by setting the fault flag high and providing a non-zero fault code on the fault-code output bus. A pre-determined maximum time interval during which to detect any faults may be configured in control logic 52. In the case of line faults that can be detected prior to even attempting to enable power switch 30, the pre-determined time interval may be configured to a small value.

Figure 5:
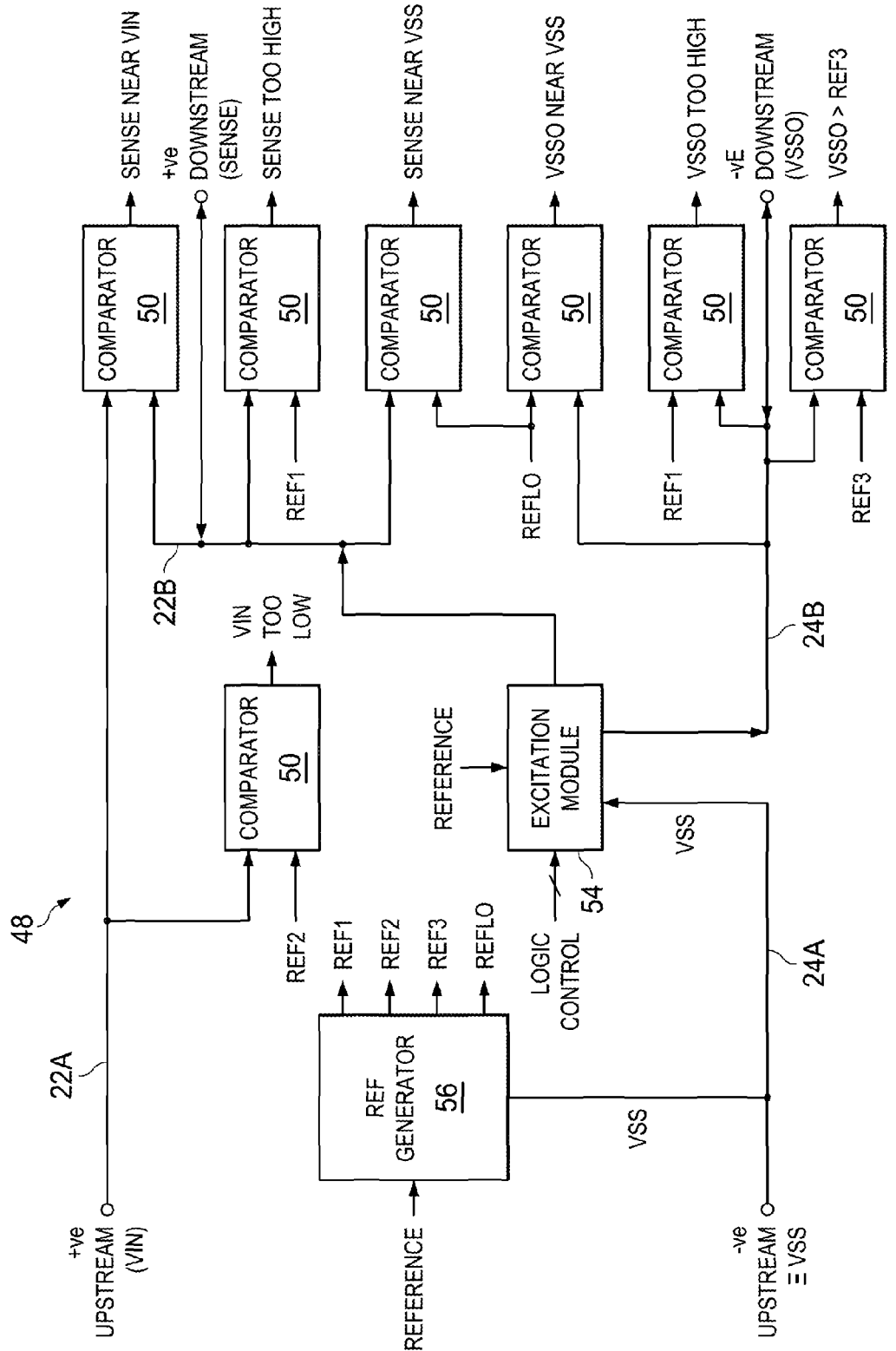
FIG. 5 is a simplified bock diagram illustrating yet other example details of an embodiment of the system.

Turning to FIG. 5, FIG. 5 is a simplified block diagram illustrating example details of sense comparators 50 according to an embodiment of system 10. In various embodiments, diagnostic module 48 can include sense comparators 50 connected to the power supply lines 22A/22B and 24A/24B, and that compare measured values affecting electrical signals (such as current, voltage, resistance, etc.) to certain pre-determined reference values or to each other. The status of both the upstream (input side) power supply lines 22A and 24A and downstream (output side) power supply lines 22B and 24B may be indicated by a combined state of the comparator outputs. For example, one sense comparator may measure input voltage VIN and compare to a pre-determined input voltage value. A non-zero difference for example, which is beyond pre-determined limits, may trigger an output from sense comparator 50 to control logic 52. Various other parameters, such as voltage at pins VSS, VSSO, etc., may be measured within the broad scope of the embodiments.

An excitation module 54 can gently excite downstream power supply lines 22B and 24B with either voltage or currents to test the lines. The response of sense comparators 50 to the various excitations can indicate the presence or absence of a fault on the downstream network. An excitation module 54 may receive control signals form control logic 50 that serve to excite one or more sense comparators 50. A reference generator 56 may generate reference signals for one or more sense comparators 50.

Figure 6:
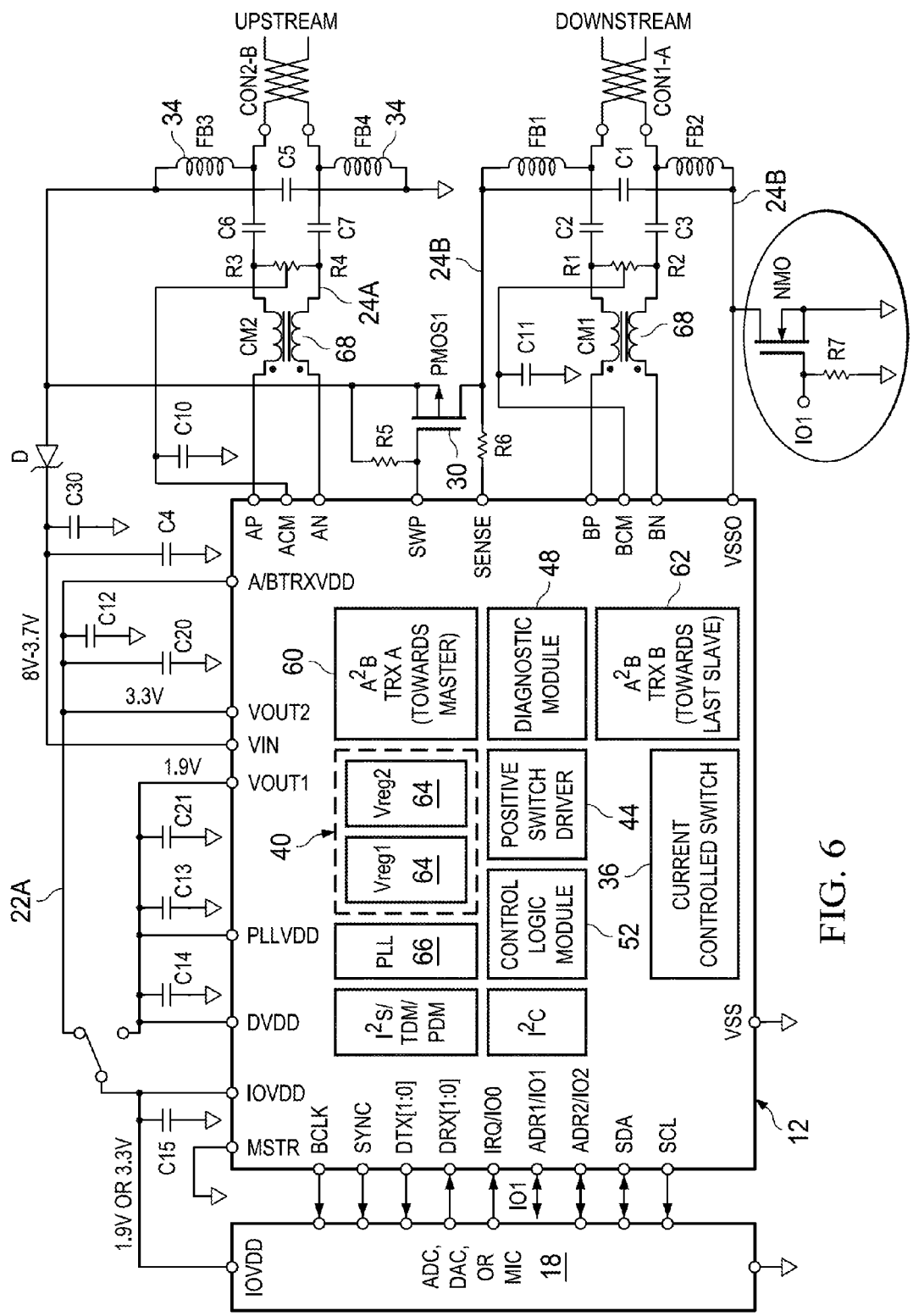
FIG. 6 is a simplified block diagram illustrating yet other example details of an embodiment of the system.

Turning to FIG. 6, FIG. 6 is a simplified block diagram illustrating an example $A^2B$ chip 12 including power switching and diagnostic hardware according to an embodiment of system 10. Inductors 34 include ferrite beads on the upstream and downstream power supply lines 22A/24A and 22B/24B. In addition to positive switch driver 44, current controlled switching element 36, diagnostic module 48, and control logic 52, $A^2B$ chip 12 may include an $A^2B$ transceiver 60 may transmit and receive electrical signals to and from the upstream network (e.g., towards the master node), and another $A^2B$ transceiver 62 may transmit and receive electrical signals to and from the downstream network (e.g., towards other slave nodes). A Power supply regulator 40 may include one or more voltage regulators 64. A Phased Locked Loop (PLL) 66 may be included to synchronize the power switching procedure, and/or data transfer process.

A common mode choke 68 may be optionally included in some embodiments to withstand electromagnetic interference and reduce electromagnetic radiation out of $A^2B$ bus 14. In some embodiments, as illustrated in the FIGURE, power switch 30 may be provided outside $A^2B$ chip 12. In other embodiments, both power switch 30 and negative side switch (e.g., current controlled switching element 36) may be provided within (and integral to) $A^2B$ chip 12. In yet other embodiments, power switch 30 may be provided within $A^2B$ chip 12, and the negative side switch (e.g., current controlled switching element 36) may be provided outside $A^2B$ chip 12.

Figure 7:
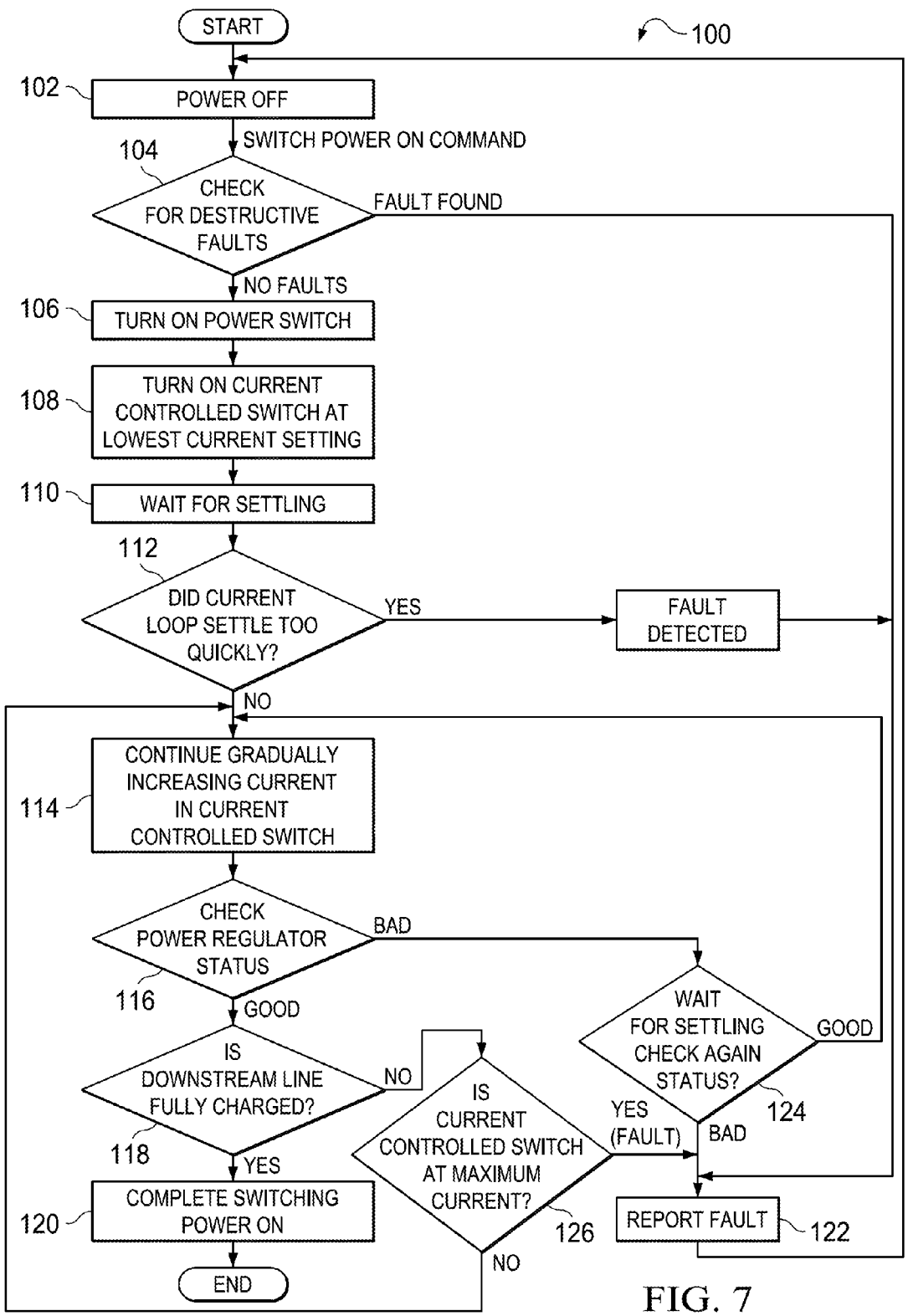
FIG. 7 is a simplified flow diagram illustrating example operations that may be associated with an embodiment of the system.

Turning to FIG. 7, FIG. 7 is a simplified flow diagram illustrating example operations 100 that may be associated with a power switching procedure according to embodiments of system 10. In various embodiments, current controlled switching element 36 may be manipulated to gradually increase the charging current in the downstream cable until the downstream cable is fully charged. During the power on process, faults may be detected by appropriate sense comparators 50 and other components associated with diagnostic module 48.

At 102, power to downstream $A^2B$ chip 12 is turned off. Power may be switched on command (e.g., from master node 12(1)), for example, by setting the start flag high to indicate the start of power switching. At 104, diagnostic module 48 may check for destructive faults in downstream power supply lines 22B and 24B. For example, excitation module 54 in diagnostic module 48 may excite the downstream cable with voltage or current to detect destructive faults. If no faults are found, at 106, power switch 30 may be turned on. At 108, current controlled switching element 36 may be turned on at its lowest setting of the charging current. At 110, system 10 may wait (e.g., for a pre-determined time interval) for settling. At 112, the rate of settling of current in system 10 may be monitored, and a determination may be made whether the rate of settling is higher than a pre-determined threshold (e.g., the current loop settled too quickly). For example, appropriate sense comparators 50 may monitor a rate of change of current in the downstream cable, and compare it with the current in the upstream cable.

If the current loop did not settle too quickly, indicating no open circuit fault in downstream power supply lines 22B and 24B, at 114, current setting of current controlled switching element 36 may be gradually increased. At 116, the status of the local power supply may be checked, for example, at power regulator 40. If the status is viable (e.g., "good" with VIN within specifications), indicating no problems with the local power supply, a determination may be made at 118 if downstream power supply lines 22B and 24B are fully charged and a pre-determined charging rate is reached. If the downstream power supply lines 22B and 24B are fully charged, at 120, the power switching procedure may be completed. The completion flag may be set high to indicate the completion of power switching.

Turning back to 104, if destructive faults are detected, the operations may loop to 122, at which the faults may be reported to control logic 52 (and to the master node and/or host 18 as appropriate). For example, the fault flag may be set high to indicate a fault, and an appropriate fault-code may be injected into the fault-code line. Likewise, turning back to 112, if the current loop settled too quickly, indicating an open circuit fault in downstream power supply lines 22B and 24B, the operations may loop back to 122, to report the detected fault as appropriate. Similarly, turning back to 116, if the power supply regulator status is "bad" indicating that the local power supply is not viable, at 124, a wait time may be enabled for settling to recheck the status. If the status continues to be bad, indicating a fault, the operations may loop to 122, at which faults may be reported as appropriate.

Turning back to 118, if downstream power supply lines 22B and 24B are not fully charged, at 126, a determination may be made whether the current sink is at its maximum setting. If the current sink at current controlled switching element 36 may is not at its maximum setting, the current sink setting may be increased at 114, and the operations may continue thereafter. On the other hand, if the current sink setting is at the maximum setting, and the downstream power supply lines 22B and 24B are not fully charged, a fault may be indicated, and the operations may loop back to 122, at which the fault may be reported as appropriate.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

In the discussions of the embodiments above, the capacitors, clocks, DFFs, dividers, inductors, resistors, amplifiers, switches, digital core, transistors, and/or other components can readily be replaced, substituted, or otherwise modified in order to accommodate particular circuitry needs. Moreover, it should be noted that the use of complementary electronic chips, hardware, software, etc. offer an equally viable option for implementing the teachings of the present disclosure.

In one example embodiment, any number of electrical circuits of the FIGURES may be implemented on a board of an associated electronic chip. The board can be a general circuit board that can hold various components of the internal electronic system of the electronic chip and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and other peripheral chips may be attached to the board as plug-in cards, via cables, or integrated into the board itself.

In another example embodiment, the electrical circuits of the FIGURES may be implemented as stand-alone modules (e.g., a chip with associated components and circuitry configured to perform a specific application or function) or implemented as plug-in modules into application specific hardware of electronic chips. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the functionalities as described herein may be implemented in one or more silicon cores in Application Specific Integrated Circuits (ASICs), Field Programmable Gate Arrays (FPGAs), and other semiconductor chips.

It is also imperative to note that all of the specifications, dimensions, and relationships outlined herein (e.g., the number of components, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular component arrangements. Various modifications and changes may be made to such embodiments without departing from the scope of the appended claims. The description and drawings are, accordingly, to be regarded in an illustrative rather than in a restrictive sense.

Note that the activities discussed above with reference to the FIGURES are applicable to any integrated circuits that involve signal processing, particularly those that rely on synchronization signals to execute specialized software programs, or algorithms, some of which may be associated with processing digitized real-time data. Certain embodiments can relate to multi-DSP signal processing, floating point processing, signal/control processing, fixed-function processing, microcontroller applications, etc. In certain contexts, the features discussed herein can be applicable to medical systems, scientific instrumentation, wireless and wired communications, radar, industrial process control, audio and video equipment, current sensing, instrumentation (which can be highly precise), and other digital-processing-based systems.

Moreover, certain embodiments discussed above can be provisioned in digital signal processing technologies for medical imaging, patient monitoring, medical instrumentation, and home healthcare. This could include pulmonary monitors, accelerometers, heart rate monitors, pacemakers, etc. Other applications can involve automotive technologies for safety systems (e.g., stability control systems, driver assistance systems, braking systems, infotainment, and interior applications of any kind). Furthermore, powertrain systems (for example, in hybrid and electric vehicles) can apply the functionalities described herein in high-precision data conversion products in battery monitoring, control systems, reporting controls, maintenance activities, etc.

In yet other example scenarios, the teachings of the present disclosure can be applicable in the industrial markets that include process control systems that help drive productivity, energy efficiency, and reliability. In consumer applications, the teachings of the electrical circuits discussed above can be used for image processing, auto focus, and image stabilization (e.g., for digital still cameras, camcorders, etc.). Other consumer applications can include audio and video processors for home theater systems, DVD recorders, and high-definition televisions. Yet other consumer applications can involve advanced touch screen controllers (e.g., for any type of portable media chip). Hence, such technologies could readily part of smartphones, tablets, security systems, PCs, gaming technologies, virtual reality, simulation training, etc.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

OTHER NOTES, EXAMPLES, AND IMPLEMENTATIONS

Note that all optional features of the apparatus described above may also be implemented with respect to the method or process described herein and specifics in the examples may be used anywhere in one or more embodiments. In a first example, a system is provided (that can include any suitable circuitry, dividers, capacitors, resistors, inductors, ADCs, DFFs, logic gates, software, hardware, links, etc.) that can be part of any type of computer, which can further include a circuit board coupled to a plurality of electronic components. The system can include means for turning on a power switch of a power switching circuit if no destructive faults are detected in the system; means for turning on a current source of the power switching circuit at a lowest setting of charging current; means for monitoring a rate of settling of current in the system; means for detecting the status of a local power supply at the A2B chip; and means for gradually increasing the charging current if the rate of settling is higher than a pre-determined threshold and the local power supply is viable, until a pre-determined charging rate is reached.

The system can also include means for reporting detected faults; means for determining whether a downstream cable is fully charged; means for exciting the downstream cable with voltage of current to detect destructive faults; means for waiting for settling of current in the system; means for setting a first flag high to indicate start of power switching; means for setting a second flag high to indicate completion of power switching; and means for setting a third flag high to indicate a fault (e.g., in the downstream cable).

The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

What is claimed is:

1. A power switching circuit of a communication device for use in a bi-directional two-wire communication system, comprising:
    an upstream coupling circuit to couple the communication device to an upstream communication device via an upstream pair of wires, wherein the upstream coupling circuit is to receive data and power from an electrical signal transmitted to the communication device from the upstream communication device over the upstream pair of wires; and
    a downstream coupling circuit to couple the communication device to a downstream communication device via a downstream pair of wires, wherein the downstream coupling circuit is to provide data and power over the downstream pair of wires to the downstream communication device according to a nominal power switching procedure;
    wherein the power switching circuit is to detect one or more faults in the communication system before, during and after the nominal power switching procedure, and to modify the nominal power switching procedure in response to detection of one or more faults; and
    wherein the nominal power switching procedure includes a gradual increase of current provided to the downstream pair of wires.

2. The power switching circuit of claim 1, wherein the downstream coupling circuit is to sense a condition of the downstream pair of wires before, during, and after the nominal power switching procedure, and to provide feedback to a switch control mechanism.

3. The power switching circuit of claim 2, wherein, under the nominal power switching procedure, the downstream coupling circuit is to gradually charge the downstream pair of wires and the downstream communication device over a bounded charging time simultaneously with preservation of local power and data communication.

4. The power switching circuit of claim 3, wherein the power switching circuit is to maintain a local power supply voltage during the nominal power switching procedure.

5. The power switching circuit of claim 1, wherein the downstream coupling circuit is to enable power to the downstream communication device in response to a command from a master communication device upstream of the communication device.

6. The power switching circuit of claim 1, wherein the power switching circuit is to complete the nominal power switching procedure if no faults are detected.

7. The power switching circuit of claim 1, comprising:
    a power switch to isolate the communication device from the downstream communication device;
    a diagnostic module comprising a plurality of sense comparators to detect one or more faults in the communication system before, during, and after the nominal power switching procedure;
    a control logic to control a current source to dynamically adapt a charging current to a load on the downstream pair of wires until a pre-determined charging rate is achieved; and
    a local power regulator to provide feedback on a status of a local power supply at the communication device.

8. The power switching circuit of claim 7, wherein the current source comprises a current controlled switching element.

9. The power switching circuit of claim 7, wherein the control logic comprises a digital circuit.

10. The power switching circuit of claim 7, wherein the control logic is to control the power switch through a switch driver.

11. The power switching circuit of claim 7, wherein the power switch is located on a positive side of a power supply line decoupled from a data line in the communication device, and wherein the current source is located on a negative side of the power supply line.

12. The power switching circuit of claim 11, wherein the current source is integrated into a chip of the communication device, the chip including the control logic, and the power switch is located outside the chip.

13. The power switching circuit of claim 11, wherein the current source is located outside a chip of the communication device, the chip including the control logic, and the power switch is integrated into the chip.

14. The power switching circuit of claim 7, wherein the diagnostic module includes an excitation module to excite the downstream pair of wires with either voltage or current, and wherein the sense comparators detect the excitation if no fault exists on the downstream pair of wires.

15. A power switching method executed by a communication device in a bi-directional two-wire communication system, the method comprising:
    receiving data and power from an electrical signal transmitted to the communication device from an upstream communication device over an upstream pair of wires;
    providing data and power over a downstream pair of wires to a downstream communication device in accordance with a nominal power switching procedure, wherein the nominal power switching procedure includes a gradual increase of current provided to the downstream pair of wires;
    detecting one or more faults in the communication system before, during, or after the nominal power switching procedure; and
    modifying the nominal power switching procedure in response to detecting the one or more faults.

16. The power switching method of claim 15, wherein the nominal power switching procedure includes:
    turning on a current source of the power switching circuit at a lowest setting of charging current;
    monitoring a rate of settling of current in the communication system;
    detecting a status of a local power supply at the communication device; and increasing the charging current if the rate of settling is higher than a pre-determined threshold, and the local power supply is viable, until a pre-determined charging rate is reached.

17. The power switching method of claim 15, wherein the nominal power switching procedure includes:
determining whether the downstream pair of wires is fully charged.

18. The power switching method of claim 15, wherein detecting one or more faults includes:
exciting the downstream pair of wires with voltage or current to detect destructive faults.

19. The power switching method of claim 15, wherein the nominal power switching procedure includes:
setting a first flag high to indicate start of power switching;
setting a second flag high to indicate completion of power switching; and
setting a third flag high to indicate a fault.

* * * * *